United States Patent [19]

Sauder

[11] Patent Number: 4,965,991
[45] Date of Patent: Oct. 30, 1990

[54] CROP FEEDING SYSTEM

[76] Inventor: David E. Sauder, Rte. 1, LeRoy, Kans. 66857

[21] Appl. No.: 434,028

[22] Filed: Nov. 9, 1989

[51] Int. Cl.$^5$ .......................................... A01D 45/02
[52] U.S. Cl. ...................................... 56/119; 56/14.3
[58] Field of Search ............ 56/94, 98, 119, 14.3–14.6

[56] References Cited

U.S. PATENT DOCUMENTS

| | | | |
|---|---|---|---|
| 2,836,026 | 5/1958 | Gray et al. | 56/119 |
| 3,035,387 | 5/1962 | Bevil | 56/119 X |
| 3,854,272 | 12/1974 | Lane, III et al. | 56/119 X |
| 4,137,695 | 2/1979 | Sammann | 56/119 |
| 4,177,626 | 12/1979 | McNaught | 56/14.5 |
| 4,337,612 | 7/1982 | Dean et al. | 56/119 X |
| 4,476,667 | 12/1984 | Moss | 56/119 |
| 4,722,174 | 2/1988 | Landry et al. | 56/119 X |

Primary Examiner—Thuy M. Bui
Attorney, Agent, or Firm—Litman, McMahon & Brown

[57] ABSTRACT

A crop feeding system is provided for a crop gathering implement and includes a frame assembly mounted on the crop gathering implement above a transverse crop cutting mechanism thereof. A pair of wheel subassemblies are mounted on the frame assembly and each includes a generally vertical rotational axis. A drive motor is mounted on the frame assembly and is drivingly connected to one of the wheel subassemblies. The wheel subassemblies are in engagement whereby the driven wheel subassembly drive the other wheel subassembly. The wheel subassemblies are positioned for gathering crops and guiding them into the crop gathering implement.

17 Claims, 4 Drawing Sheets

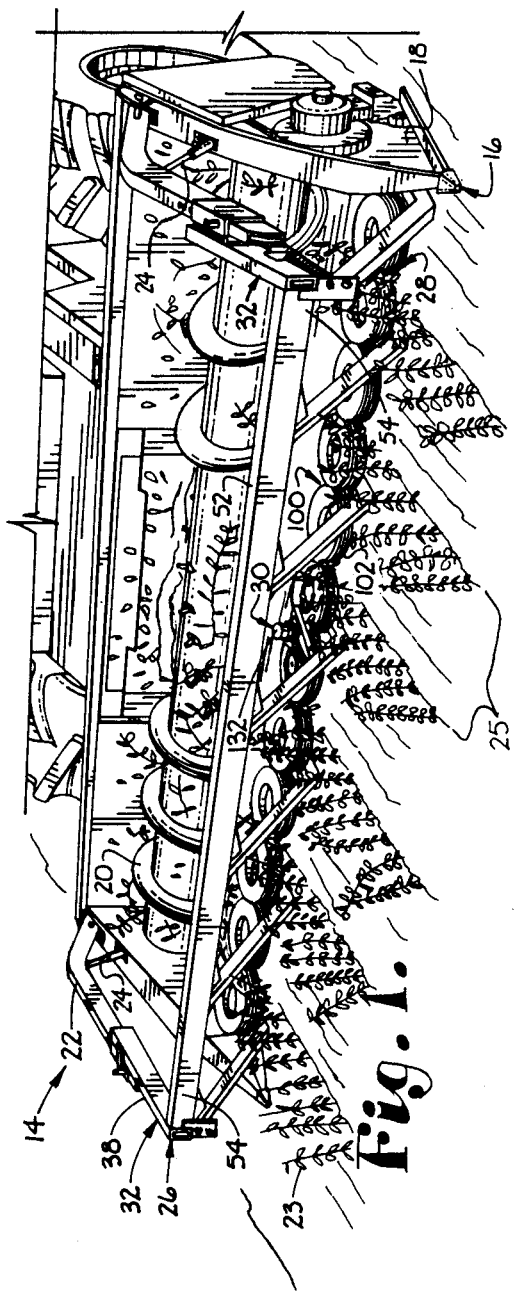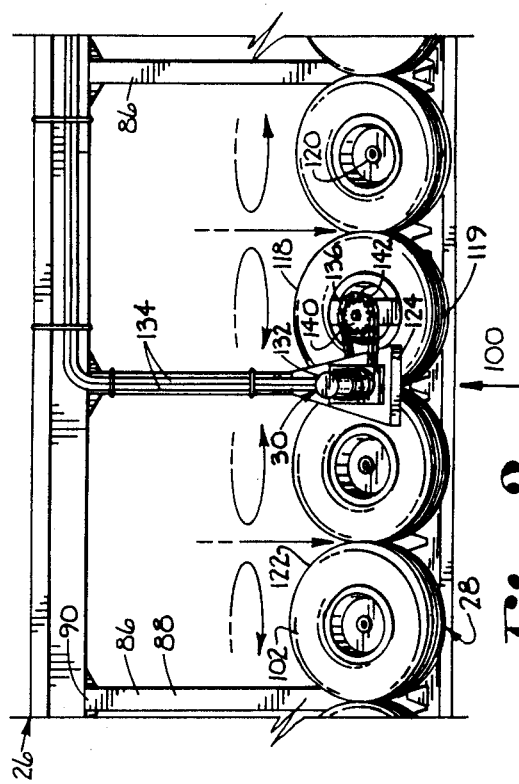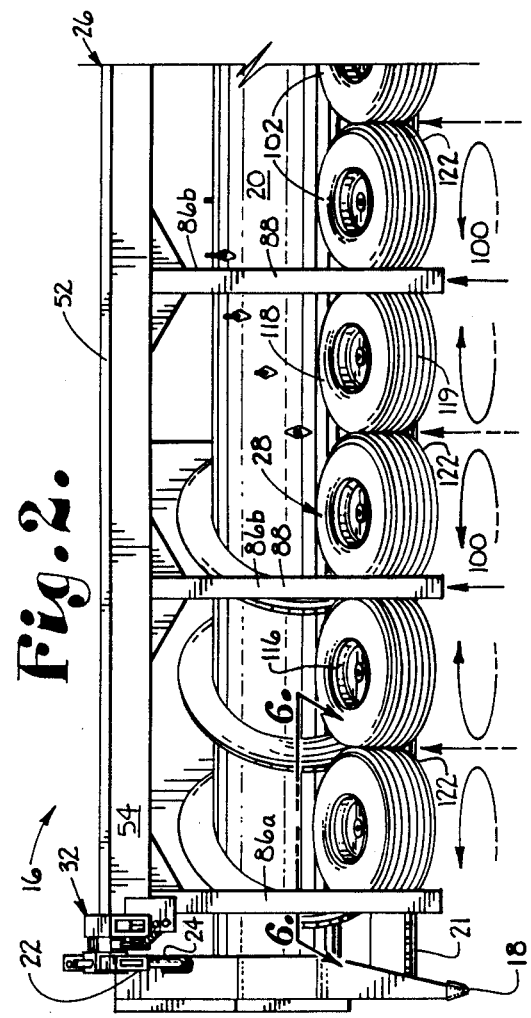

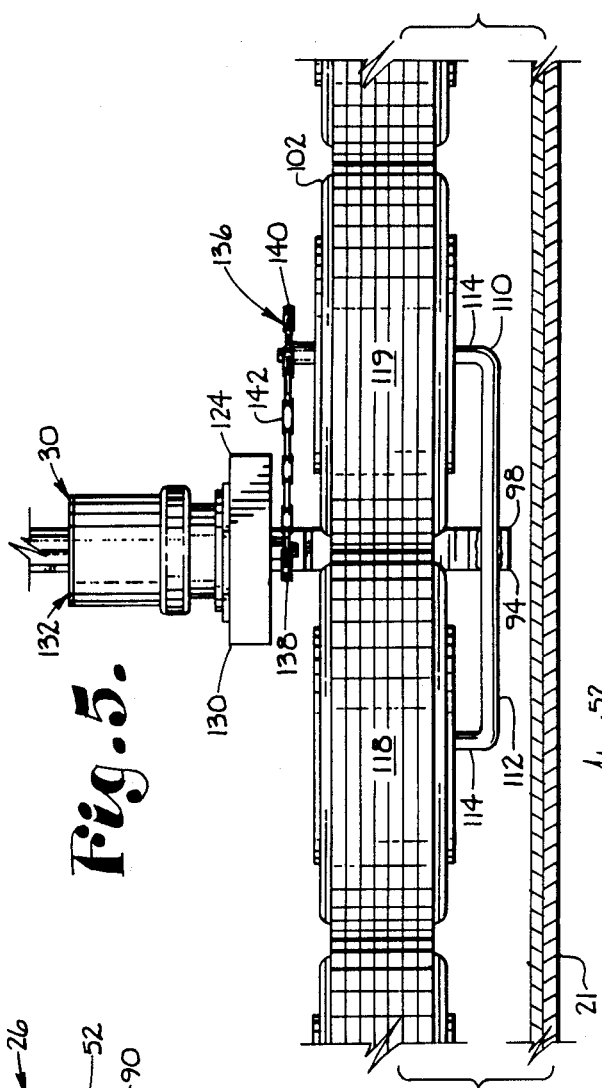
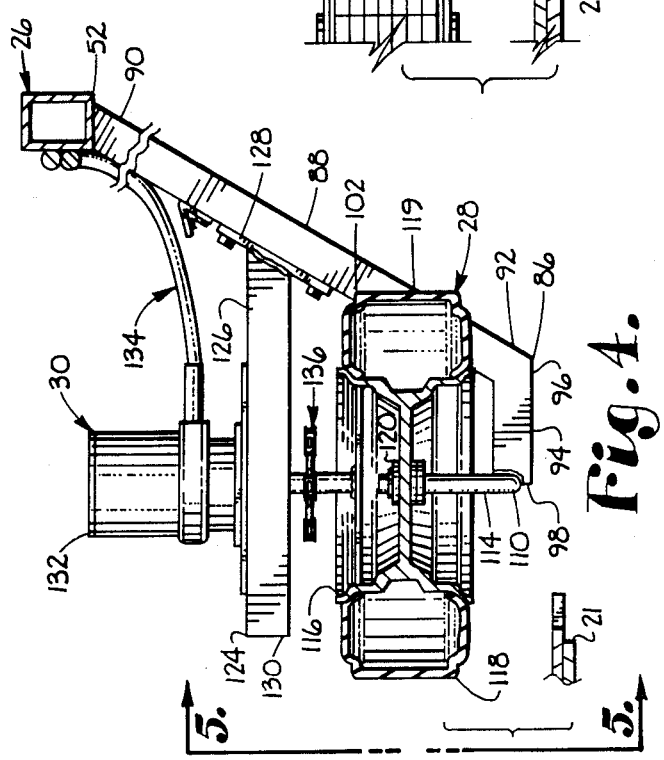
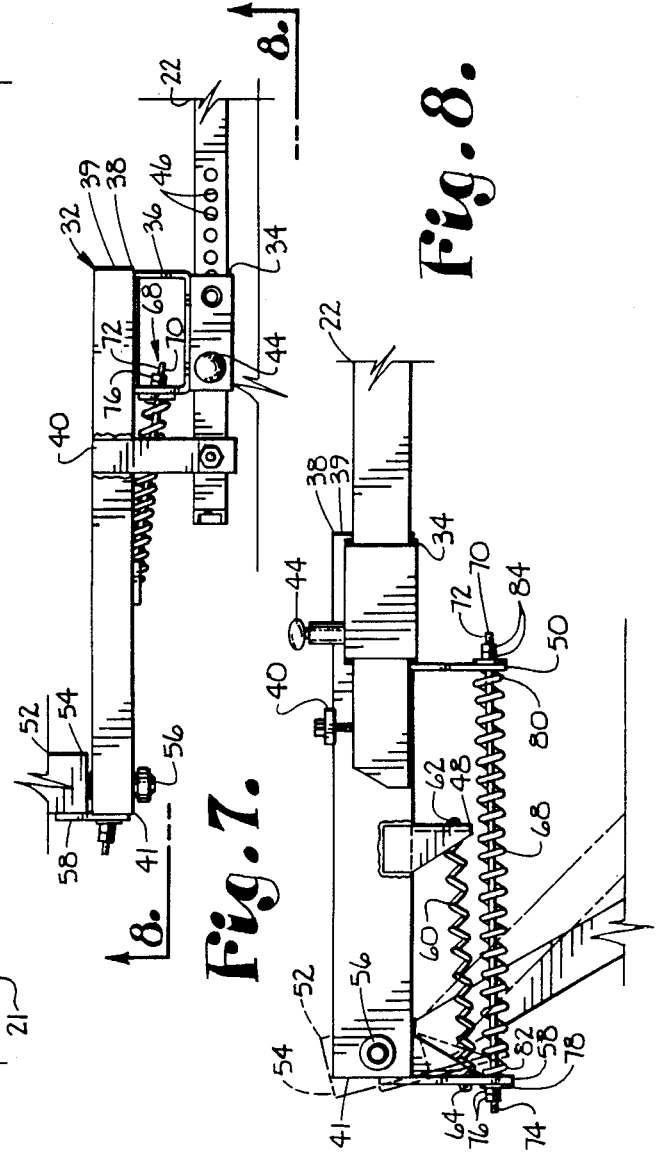
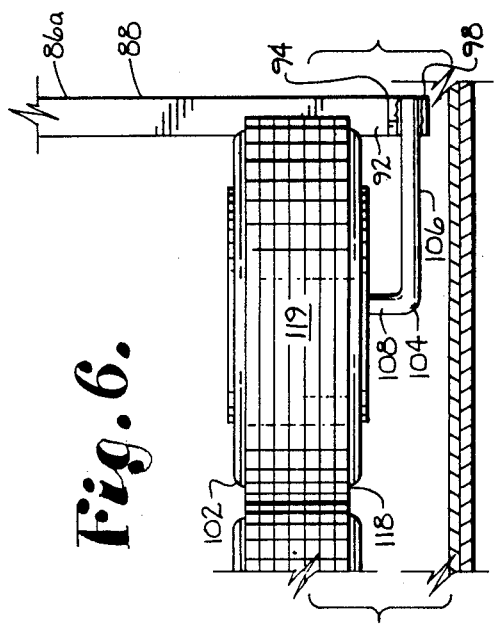

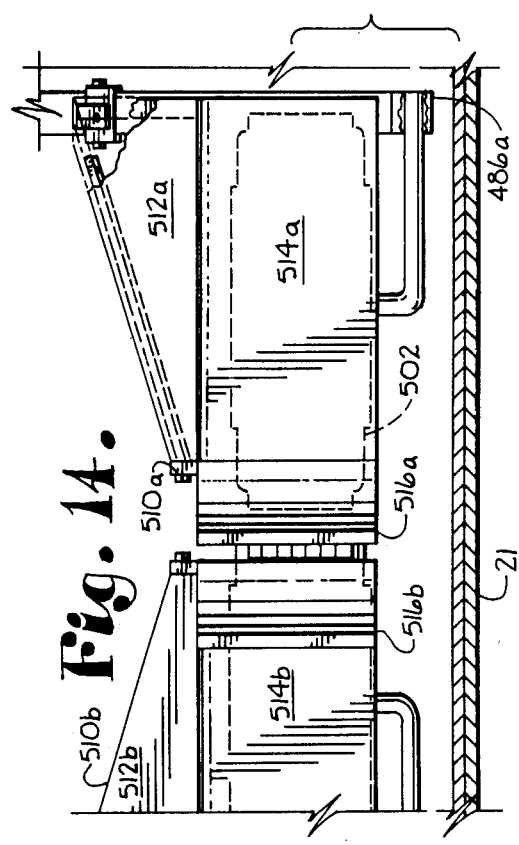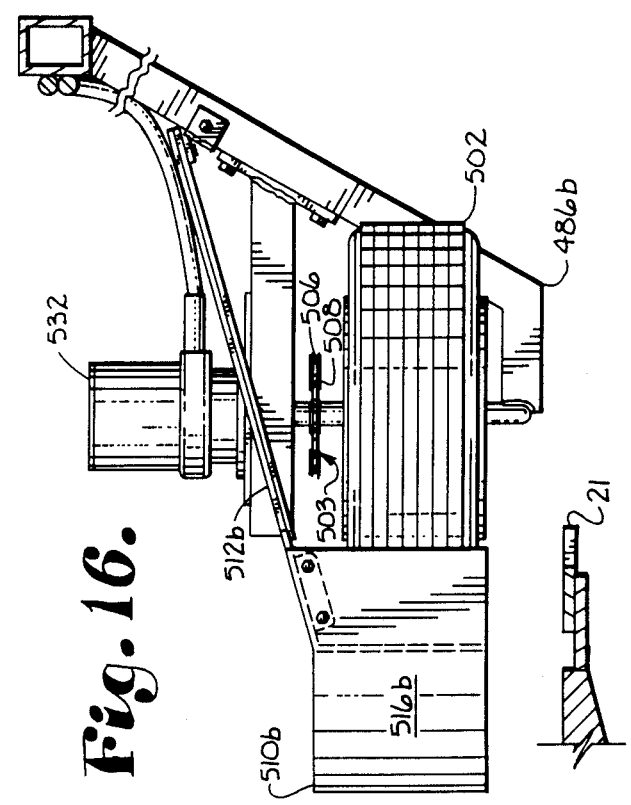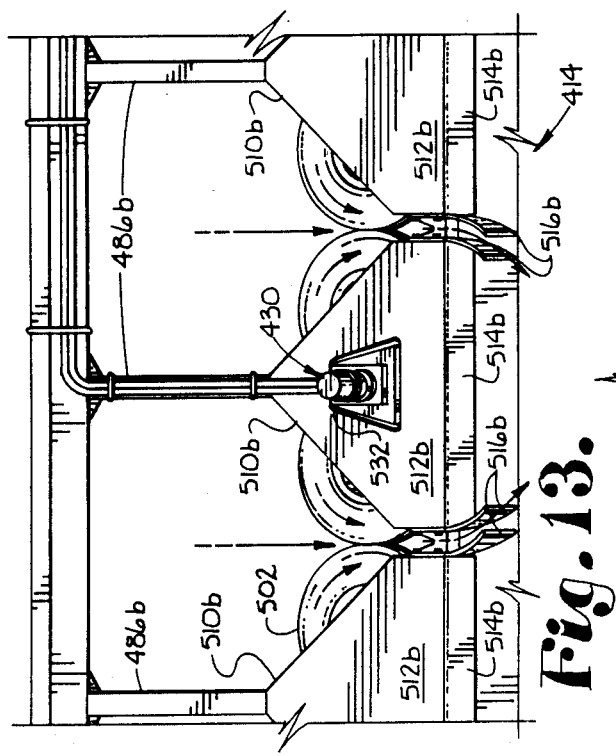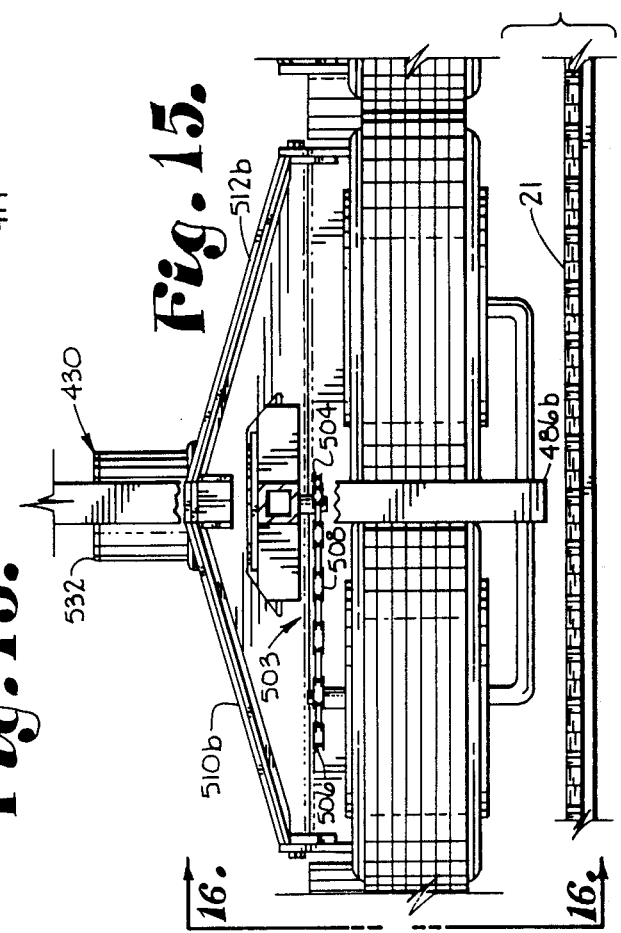

CROP FEEDING SYSTEM

BACKGROUND OF THE INVENTION

1. Field of the Invention

The present invention relates generally to harvesting or crop gathering equipment and in particular to a row crop feeding system for combines.

2. Description of the Related Art

Crop harvesting equipment includes combines and similar implements which, upon moving through fields being harvested, gather the crops by cutting their stalks relatively low and guiding the severed plant portions into the implements for further processing. Sickle bars extending transversely to the path of movement are commonly employed in combines for severing the crop stalks relatively close to the ground. The width of the sickle bar generally defines the swath width.

A variety of mechanisms have heretofore been employed on combines for guiding the crop plants into the sickle bars. A combine header generally includes a cutting mechanism (e.g. a sickle bar) and some type of crop feeding mechanism. For example, the Gray et al. U.S. Pat. No. 2,836,026 discloses multiple vertical cylinder attachments for row crop headers with finger rods for guiding the crops to a cutter bar. Endless, intermeshing slat conveyors in a row crop gatherer are disclosed in the Bevel U.S. Pat. No. 3,035,387. Guide belts for guiding crops separated by floating snouts are disclosed in the Dean et al. U.S. Pat. No. 4,337,612.

Combine headers have also been equipped with reels comprising horizontal, cylindrical rotating assemblies positioned over sickles for guiding crops rearwardly.

Many previous combine headers experienced significant crop loss problems in operation. Such losses were often attributable to "sickle shatter" which occurred when impact from the combine header caused crop portions (e.g. soybeans) to dislodge from the harvested plants and hence be wasted. The operation of combine header reels tended to contribute to such losses because they operated by striking crops from above whereby they were pushed downwardly and rearwardly to the cutting mechanism. Such crop losses tended to be especially problematical with soybeans, milo and similar crops.

Previous crop feeding systems suffered from other disadvantages, including maintenance problems associated with their drive mechanisms, which often comprised complicated belt and/or gear-and-sprocket mechanisms.

The present invention addresses the aforementioned problems with previous crop feeding systems.

SUMMARY OF THE INVENTION

In the practice of the present invention, a crop feeding system is provided for a crop gathering implement, such as a combine, with a pair of laterally spaced reel arms. The crop feeding system includes a frame assembly with a transverse beam extending between the implement reel arms and multiple wheel mounting subframes depending downwardly and extending rearwardly from the transverse beam. A wheel system includes multiple wheel assemblies mounted in pairs on respective wheel mounting subframes. Each wheel assembly includes a tire drivingly engaging the tires of adjacent wheel assemblies. A drive assembly includes a motor mounted on one of the wheel mounting subframes and drivingly connected to one of the wheel assemblies. The driving engagement of the wheel assemblies causes all of them to rotate when the driven wheel is rotated.

OBJECTS AND ADVANTAGES OF THE INVENTION

The objects and advantages of the present invention include: providing a crop feeding system; providing such a system which is adapted for mounting on existing combine heads; providing such a system which reduces crop losses under certain conditions compared to previous systems; providing such a system which can be constructed without belts or chains in its drive train; providing such a system which eliminates some of the drive mechanism components which required frequent maintenance in previous systems; providing such a system which is economical to manufacture, efficient in operation, simple in construction, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a combine head with a crop feeding system embodying the present invention;

FIG. 2 is an enlarged, fragmentary, front elevational view of the crop feeding system.

FIG. 3 is an enlarged, fragmentary, top plan view of the crop feeding system.

FIG. 4 is an enlarged, fragmentary, vertical, cross-sectional view of the crop feeding system taken generally along line 4—4 in FIG. 3.

FIG. 5 is an enlarged, fragmentary, rear elevational view of the crop feeding system taken generally along line 5—5 in FIG. 4.

FIG. 6 is an enlarged, fragmentary, rear elevational view of the crop feeding system taken generally along line 6—6 in FIG. 1.

FIG. 7 is an enlarged, fragmentary, top plan view of the crop feeding system particularly showing a reel arm extension thereof.

FIG. 8 is an enlarged, fragmentary, side elevational view of the crop feeding system taken generally along line 8—8 in FIG. 7.

FIG. 13 is a fragmentary, top plan view of a crop feeding system comprising a second alternative or modified embodiment of the present invention.

FIG. 14 is an enlarged, fragmentary, rear elevational view of the second alternative or modified crop feeding system.

FIG. 15 is an enlarged, fragmentary, front elevational view of the second alternative or modified crop feeding system.

FIG. 16 is an enlarged, fragmentary, cross-sectional view of the second alternative or modified crop feeding system taken generally along line 16—16 in FIG. 15.

DETAILED DESCRIPTION OF THE PREFERRED EMBODIMENT

I. Introduction and Environment

Figure 11:
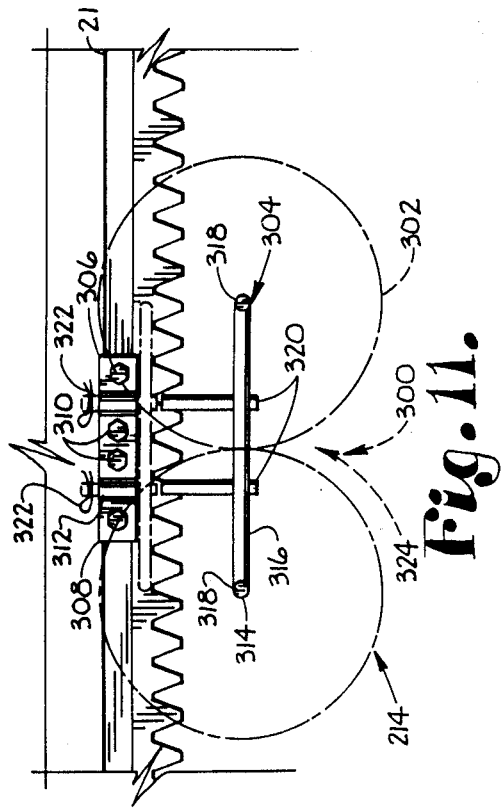
FIG. 11 is a fragmentary, top plan view of a crop feeding system comprising a first alternative or modified embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. Said terminology will include the words specifically mentioned, derivatives thereof and words of similar import.

Referring to the drawings in more detail, the reference numeral 14 generally designates a crop feeding system embodying the present invention. The crop feeding system 14 is shown mounted on a combine head 16 comprising a pair of side panels 18 mounting an auger 20 extending transversely therebetween and a pair of reel arms 22 which can be raised and lowered by piston-and-cylinder units 24 (FIG. 1). A sickle bar 21 extends between the side panels 18 below and in front of the auger 20.

The combine head 16 can mount a reel (not shown) between the reel arms 22, and in fact many combine heads are provided with such reels as standard equipment. It will be appreciated that the present invention is designed to function as an alternative crop feeding system which can be relatively easily interchanged with a more conventional reel, or can function as the exclusive crop feeding system for the combine head 16. The particular configuration of the combine head 16, along with other variable considerations affecting the configuration of the crop feeding system 14, can vary in response to such considerations as the type of crop to be harvested, field conditions, etc. For example, the crop feeding system 14 is particularly designed for use with row crops 23, such as soybeans and milo, which are commonly planted in rows 25 on thirty-inch centers. Other crops, such as wheat, are commonly planted by drilling rows on approximately eight-inch centers, and can be harvested with combines equipped with conventional reels.

The crop feeding system 14 generally includes a frame assembly 26, a wheel assembly 28, and a drive assembly 30.

II. Frame Assembly 26

The frame assembly 26 includes a pair of reel arm extension subassemblies 32 each having a sleeve 34 slidably receiving a respective reel arm 22, a spacer 36 mounted on the inside of the sleeve 34, an extension arm 38 extending forwardly from the spacer 36, and a stiffening strap or gusset 40 interconnecting the reel arm 22 and the extension arm 38 in front of the sleeve 34 and spacer 36.

A spring-loaded detent or plunger mechanism 44 is provided for affixing the extension subassembly 32 in a desired front-to-back position on the reel arm 22 by inserting into a reel arm receiver 46. Each extension arm 38 includes a rear end 39 attached to a respective spacer 36 and a front end 41. A transverse bar 52 includes opposite ends 54 each pivotally connected to a respective extension arm front end 41 by an axle bolt 56.

A tension spring arm 48 depends downwardly from the extension arm 38 and a rear compression spring arm 50 depends downwardly from the front end of the sleeve 34. A pair of front spring arms 58 are mounted on the transverse bar opposite ends 54 and depend downwardly therefrom. A pair of tension spring subassemblies 60 each includes rear and front ends 62, 64 adjustably connected to a respective tension spring arm 48 and a respective front spring arm 58 respectively. One or both of the ends 62, 64 can be provided with a threaded length-adjustable hook for adjusting the tension in the spring subassembly 60, which biases the crop feeding system 14 upwardly and rearwardly.

A pair of compression spring subassemblies 68 each includes a threaded rod 70 with a rear end 72 extending through a respective compression spring arm 50 and a front end 74 extending through a respective front spring arm 58. The rod rear end 72 can be adapted to slidably reciprocate with respect to a respective compression spring arm 50 and the rod front end 74 can be rigidly connected to a respective front spring arm 58 by nuts 76 and washers 78. Rear and front compression spring ends 80, 82 are positioned between the arms 50, 58. The effective length of the rod 70 can be adjusted by nuts 84 mounted on its rear end 72 or by the nuts 76 mounted on its front end 74. A lost motion mechanism can thus be provided which does not compress the springs 68 until the feeding system 14 has swung upwardly and rearwardly a predetermined amount. Alternatively, the compression spring subassembly 68 can be adjusted to continuously bias the feeding system 14 downwardly and forwardly and thus counter the upward-and-rearward biasing effect of the tension spring subassembly 60. Since the rod 70 is threaded (e.g. "all-thread" rod), tension and lost motion adjustments can be effected to accommodate various operating conditions.

The positions of the tension and compression spring subassemblies 60, 68 can be reversed (i.e. the tension spring subassemblies 60 mounted below the compression spring subassemblies 68) and both will perform generally in the manner described above.

A pair of outer wheel mounting subframes 86a are located adjacent to the transverse bar opposite ends 54, and inner wheel mounting subframes 86b are located therebetween. The wheel mounting subframes 86a, 86b are positioned in transversely-spaced relation along the transverse bar 52 and each includes a front leg 88 sloping downwardly and rearwardly from an upper end 90 attached to the transverse bar 52 to a lower end 92. A subframe rear leg 94 extends generally rearwardly and horizontally and includes a front end 96 connected to the front leg lower end 92 and a rear end 98. The front legs 88 form included, obtuse angles of approximately one-hundred and twenty degrees with respective rear legs 94.

III. Wheel Assembly 28

The wheel assembly 28 comprises a plurality (e.g. six are shown) of pairs 100 of juxtaposed wheel subassemblies 102 which are transversely aligned across almost the entire width of the combine head 16. Each outer wheel-mounting subframe 86a mounts an outer, single axle 104 with a base 106 attached to the rear leg rear end 98 and projecting inwardly therefrom, and a leg 108 projecting upwardly therefrom. Multiple (e.g. five are shown) double, inner axles 110 each includes a base 112 attached to a respective rear leg rear end 98 and a pair of legs 114 projecting upwardly therefrom.

Each wheel subassembly 102 includes a wheel 116 rotatably mounted on a respective axle 104 or 110 and mounting a tire 118. The tires 118 can comprise any suitable material, such as natural or synthetic rubber, and are preferably inflatable for adjusting the engagement therebetween.

Each wheel subassembly 102 also includes a hub 120 with suitable bearings. Each axle leg 108, 114 extends along a generally vertical rotational axis. The rotational axes are transversely spaced at approximately fifteen inches whereby the center of each wheel pair 100 forms a crop-receiving mouth 122 defined by the circumferential, annular tread portions 119 of the tires 118, which mouths 122 are transversely spaced at intervals of approximately thirty inches, which correspond to the crop row spacings.

IV. Drive Assembly 30

The drive assembly 30 includes a motor mounting subframe 124 with an arm 126 attached to a wheel-mounting subframe front leg 88 by a plate 128 intermediate the leg ends 90, 92. The arm 126 projects rearwardly and terminates at a triangular motor mounting frame 130. The motor mounting frame 130 mounts a hydraulic motor 132 which is connected to a suitable hydraulic fluid power source (not shown) by hydraulic lines 134. The combine on which the feeding system 14 is mounted may have a hydraulic pump for powering the motor 132, or a suitable hydraulic pump can be retrofitted thereon. The hydraulic motor 132 is drivingly connected to a respective wheel subassembly 102 by a chain-and-sprocket subassembly 136. The chain-and-sprocket subassembly 136 includes a relatively small-diameter drive sprocket 138 mounted on the motor 132 and a relatively large-diameter driven sprocket 140 mounted on the respective wheel subassembly 102. The sprockets 138, 140 are drivingly interconnected by a chain 142.

Figure 10:
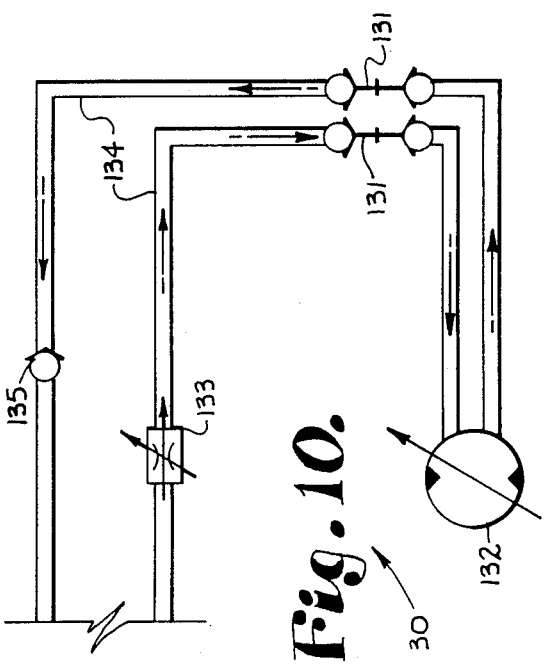
FIG. 10 is a schematic view of a hydraulic drive system of the crop feeding system.

FIG. 10 shows a schematic view of the hydraulic drive assembly 30, including quick-connect hydraulic line couplings 131, a pump 131, an adjustable valve 133 for adjusting the speed of the motor 132 and suitable check valves 135. The speed of the hydraulic motor 132, and thus the rotational speeds of the wheel subassemblies 102, can be adjusted with the adjustable valve 133.

V. Operation

In operation, the attack angle of the feeding system 14 can be adjusted with the compression spring subassemblies 68 by adjusting the lengths of their threaded rods 70. Thus, the attack angle can be adjusted to accomodate particular crop and field conditions. For example, the crop feeding system 14 can be drawn rearwardly and upwardly (i.e. by shortening the threaded rods 70) to feed a relatively low-height crop, such as beans, upwardly and into the combine head 16. The height of the crop feeding system 14 over the sickle bar 21 can be adjusted by raising and lowering the reel arms 22, i.e. by extending and retracting the piston-and-cylinder units 24 respectively. The spring subassemblies 60, 68 also function to maintain the crop feeding system 14 in position and to thereby prevent it from swinging excessively in transit. The spring subassemblies 60, 68 also function to resiliently absorb an impact if an object is struck in the field. The feeding system 14 thus "floats" with its position being maintained primarily by the spring subassemblies 60, 68. The wheel subassemblies 102 are located above the sickle bar 21, and the spatial relationship therebetween can be adjusted to accommodate various field and crop conditions.

Adjacent wheel pairs 100 cooperate to feed crops 23 into the combine head 16 through their respective crop-receiving mouths 122. The tires 118 are preferably inflated to a sufficient pressure to drivingly engage each other and to effectively handle the crops 23. Since the crops 23 are guided into the combine head 16 by resilient engagement with the tires 118, crop loss, e.g. from "sickle shatter", is minimized.

VI. First Modified or Alternative Embodiment 214

Figure 12:
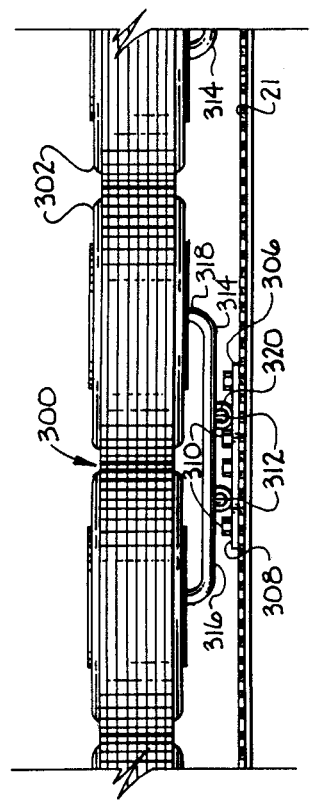
FIG. 12 is a fragmentary, front elevational view of the first alternative or modified crop feeding system taken generally along line 12—12 in FIG. 11.
Figure 9:
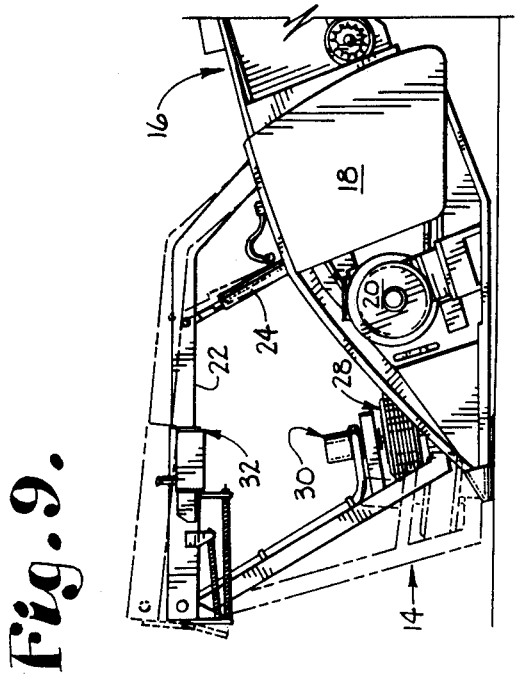
FIG. 9 is a fragmentary, side elevational view of the crop feeding system, which shows it in relation to other combine head structure.

A crop feeding system 214 comprising a first modified or alternative embodiment of the present invention is shown in FIGS. 11 and 12 and includes multiple pairs 300 of wheel subassemblies 302 mounted on the sickle bar 21 of a combine head 16 with axle subassemblies 304.

Each axle subassemby 304 includes a mounting bracket 306 with a plate 308 attached to the top of the sickle bar 21 by mounting bolts 310 and a pair of tubular sleeves 312 mounted on the plate 308 in longitudinally-extending, transversely spaced relation.

The axle subassembly 304 further includes a U-shaped axle 314 with a base 316 and a pair of legs 318 projecting upwardly therefrom. The legs 318 are generally aligned along rotational axes of the wheel assemblies 302. A pair of transversely spaced mounting shafts 320 extend rearwardly from each base 316 and are adapted to be telescopically received in respective sleeves 312. The mounting shafts 320 can be secured within the tubular sleeves 312 by suitable locking pins 322.

The axle bases 316 are generally transversely aligned above and in front of the sickle bar 21. The upstanding legs 318 are transversely spaced at approximately fifteen inch intervals.

Suitable drive means are drivingly connected to one of the wheel subassemblies 302 whereby all of the wheel subassemblies 302 are driven due to their interengagement. The drive means is not shown, but can comprise, for example, a hydraulic motor like that associated with the previously described crop feeding system embodiment 14.

In operation, crops 23 are fed to the sickle 21 for cutting and then into the combine head 16 by crop-receiving mouths 324 formed by respective wheel subassembly pairs 300.

VI. Second Modified or Alternative Embodiment

A crop feeding system 414 comprising a second modified or alternative embodiment of the present invention is shown in FIGS. 13-16 and includes a drive assembly 430 comprising a hydraulic motor 532 drivingly connected to a wheel subassembly 502 by a chain-and-sprocket drive train subassembly 503. The chain-and-sprocket subassembly 503 includes a relatively small diameter drive sprocket 504 mounted on the hydraulic motor 532 and a relatively large-diameter driven sprocket 506 mounted on the wheel subassembly 502. The sprockets 504, 506 are drivingly innerconnected by a suitable chain 508. In place of the chain-and-sprocket subassembly 103, other suitable drive mechanisms could be employed, such as a belt-and-pulley mechanism, a gear train mechanism, or a direct drive coupling.

The second alternative or modified crop feeding system 414 includes a pair of end wheel covers or guards 510a which partly cover the end wheel subassemblies 502 and a plurality of intermediate wheel covers or guards 510b which cover adjacent pairs of intermediate wheel subassemblies 502. Each end wheel cover or guard 510a includes a generally-triangular top panel 512a, a generally vertical rear panel 514a and a deflector 516a which extends rearwardly and curves inwardly from the rear panel 514a. The wheel covers or guards 510a are mounted on outer wheel-mounting subframes 486a.

Each intermediate wheel cover or guard 510b includes a top panel 512b, a rear panel 514b and a pair of deflectors 416b and is mounted on a respective wheel-mounting subframe 486b.

In operation, the wheel covers or guards 510a, 510b function to prevent crops 23 which have entered the crop feeding system 414 from being caught between adjacent wheel subassemblies 502 and ejected forwardly. More specifically, the top and rear panels 512a, 512b and 514a, 514b restrict access to the wheel subassemblies 502 from the top and back. The deflectors 516a, 516b tend to restrict access to the wheel subassemblies 502 from the sides and also, due to their inwardly-curved configurations, tend to guide the received crops towards the center of the crop feeding system 414.

Overall efficiency and effectiveness of the crop feeding system 414 can thereby be improved by the operation of the wheel covers or guards 510a, 510b.

It is to be understood that while certain forms of the present invention have been illustrated and described herein, it is not to be limited to the specific forms or arrangement of parts described and shown.

What is claimed and desired to be secured by Letters Patent is as follows:

1. In combination with a crop gathering implement including a crop cutting mechanism extending transversely to an implement direction of travel, the improvement of a crop feeding system, which comprises:
   (a) a pair of wheel means mounted in transversely juxtaposed relation and adapted for passing crop plants therebetween through the crop cutting mechanism;
   (b) drive means drivingly connected to said wheel means and adapted to counterrotate said pair of wheel means; and
   (c) feeding system mounting means mounting said feeding system on said crop gathering implement.

2. The crop feeding system according to claim 1, which includes:
   (a) said wheel means having parallel rotational axes extending in a generally vertical direction.

3. The crop feeding system according to claim 2 wherein:
   (a) each said wheel means includes a resilient tire;
   (b) said tires are mounted in driving contact with each other; and
   (c) said drive means comprises a motor drivingly connected to one of said wheels.

4. The crop feeding system according to claim 3 wherein:
   (a) said motor comprises a hydraulic motor.

5. The crop feeding system according to claim 1 wherein:
   (a) said mounting means comprises a frame assembly with a transverse beam connected to said implement and a wheel mounting subframe mounting said wheel means and connected to said transverse beam.

6. The crop feeding system according to claim 5, which includes:
   (a) said frame assembly being pivotally mounted on said implement and including a transverse pivotal axis.

7. The crop feeding system according to claim 6, which includes:
   (a) a tension spring interconnecting said frame assembly and said implement, said tension spring being adapted to bias said feeding system upwardly and rearwardly.

8. The crop feeding system according to claim 7, which includes:
   (a) a compression spring interconnecting said frame assembly and said implement, said compression spring being adapted to bias said feeding system downwardly and forwardly.

9. The crop feeding system according to claim 1, which includes:
   (a) said wheel means being mounted on said crop cutting mechanism.

10. The crop feeding system according to claim 9, which includes:
    (a) a U-shaped wheel axle assembly having a pair of upstanding legs each rotatably receiving a respective wheel and a base mounted on said crop cutting mechanism.

11. In combination with a row crop header adapted for mounting on a combine and including a transverse sickle bar and a pair of reel arms vertically movable between raised and lowered positions, the improvement of a crop feeding system, which comprises:
    (a) a frame assembly including:
       (1) a transverse beam with opposite ends each pivotally connected to a respective reel arm;
       (2) a plurality of wheel mounting subframes each including a leading leg extending downwardly and rearwardly from said transverse beam and a trailing leg extending rearwardly from said leading leg, said wheel mounting subframes being positioned in transversely spaced relation between said transverse beam opposite ends;
       (3) a tension spring with a front end connected to said transverse beam and a rear end connected to said reel arm, said tension spring being adapted to rearwardly and upwardly bias said frame assembly; and
       (4) a compression spring with a front end connected to said frame assembly and a rear end connected to said reel arm, said compression spring being adapted to forwardly and downwardly bias said frame assembly;

(b) a wheel assembly including:

(1) a plurality of wheel axle subassemblies each having a generally U-shaped configuration with a base mounted on a respective subframe rear leg and a pair of upstanding legs extending upwardly from the base leg, said base legs being transversely aligned and said upstanding legs being transversely spaced;

(2) a plurality of wheel subassemblies each including a wheel rotatably mounted on a respective axle upstanding leg and a tire mounted on said wheel, said tires drivingly engaging respective adjacent tires; and (c) a drive assembly, which includes:

(1) a motor mounting subframe mounted on a wheel mounting subframe front leg and extending rearwardly therefrom; and (2) a hydraulic motor mounted on said motor mounting subframe and drivingly connected to a respective wheel subassembly.

12. The crop feeding system according to claim 11, which includes:

(a) a plurality of wheel covers mounted on said frame assembly and each at least partly covering a respective wheel subassembly.

13. The crop feeding system according to claim 12 wherein each said wheel cover includes:

(a) a top panel located partly over a respective wheel subassembly and connected to a respective subframe leading leg; and (b) a rear panel depending downwardly from said top panel and located at least partly behind a respective wheel subassembly.

14. The crop feeding system according to claim 13 wherein each said wheel cover includes:

(a) a deflector extending rearwardly from said rear panel.

15. The crop feeding system according to claim 14 wherein:

(a) each said deflector curves inwardly towards a center of said crop feeding system and is adapted for guiding crops towards the crop feeding system center.

16. The crop feeding system according to claim 11, which includes:

(a) a drive sprocket mounted on said hydraulic motor;

(b) a driven sprocket mounted on said respective wheel subassembly; and (c) a drive chain drivingly innerconnecting said sprockets.

17. The crop feeding system according to claim 11, which includes:

(a) said motor being directly connected to said respective wheel subassembly.

* * * * *